UNITED STATES PATENT OFFICE.

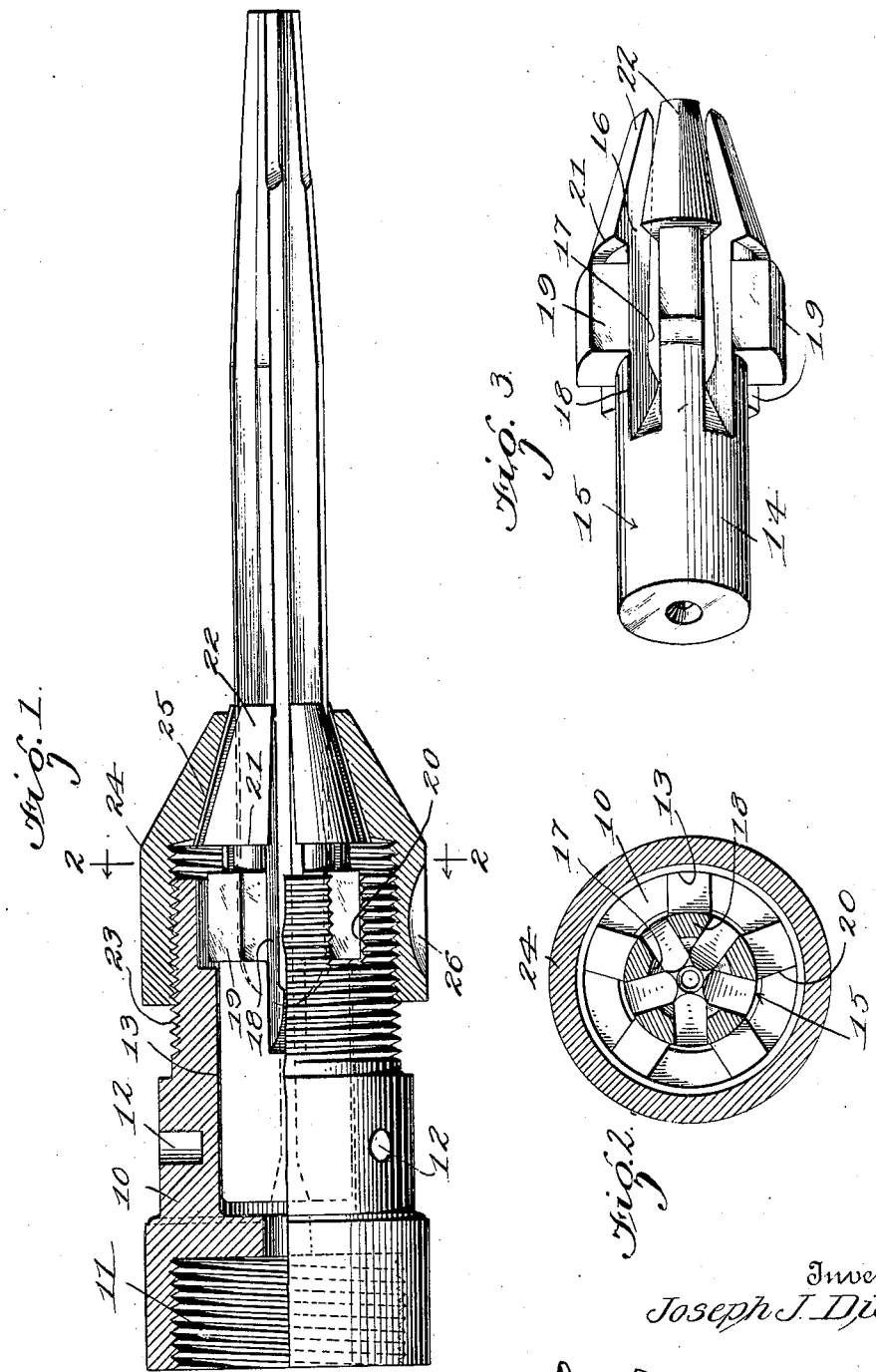

JOSEPH JOHN DIEL, OF ST. LOUIS, MISSOURI, ASSIGNOR OF ONE-HALF TO FRANKLIN G. NEAL, OF ST. LOUIS, MISSOURI.

REAMER-CHUCK.

1,369,632. Specification of Letters Patent. Patented Feb. 22, 1921.

Application filed December 8, 1919. Serial No. 343,156.

*To all whom it may concern:*

Be it known that I, JOSEPH JOHN DIEL, a citizen of the United States, residing at St. Louis and State of Missouri, have invented certain new and useful Improvements in Reamer-Chucks, of which the following is a specification.

This invention relates to improvements in reamer chucks.

An important object of the invention is to provide a chuck whereby a broken reamer or other fluted tool may be chucked for use after the shank thereof has been broken away.

High speed and carbon reamer bits, drills and the like often break from their shanks when in use and their utility is destroyed, as with the loss of the shank it becomes practically impossible to hold the reamer in a chuck. Furthermore the construction of the shank and tang upon reamers and drills adds considerably to the price thereof both for labor and material. I have provided a new chuck whereby a fluted instrument may be chucked even more efficiently without the shank than with the shank. This chuck embodies grip fingers which extend between the fluted ribs of the tool and engage the body portion thereof from which a tool may be readily removed and a new one inserted.

Other objects and advantages will be apparent throughout the course of the following description.

In the accompanying drawings wherein for the purpose of illustration is shown a preferred embodiment of my invention, Figure 1 is a side elevation partly in section of a reamer chuck embodying my invention.

Fig. 2 is a section taken on the line 2—2 thereof looking in the direction of the arrows.

Fig. 3 is a perspective of the chucking portion proper.

Referring now more particularly to the drawings the numeral 10 indicates a body portion cylindrical in form and provided upon its base end with an interiorly threaded axial bore 11 adapted for attachment to a source of motive power, as for example, an air or electric drill, drill press, or the live spindle of a lathe. The body portion 10 is provided with circumferentially spaced openings 12 adapted to receive a wrench for tightening the base of the body portion of the instrument of motive power.

The body portion 10 is provided with a second axial bore 13 adapted to receive the shank 14 of a chucking portion 15. The chucking portion 15 is provided with circumferentially spaced longitudinal slots 16 which communicate with a central bore 17 thereby forming circumferentially spaced fingers 18 joined together at one end by the shank 14.

Formed upon the fingers 18 are enlarged portions 19 which are adapted to seat in circumferentially spaced slots 20 formed in the body portion 10. It will be seen that when the shank 14 is disposed within the bore 13 and the shoulders or enlargements 19 are seated in the slots 20, that the chucking portion 15 is securely held against rotation with relation to the body portion 10. The fingers 18 are further provided with an enlarged portion 21 which tapers forwardly as at 22 so that the forward ends of the fingers are much reduced in size. The fingers 18 are sufficiently resilient to allow their gripping reamers of various sizes within certain limits.

The exterior of the body portion 10 is provided at the end receiving the chucking portion 15 with external screw threads 23, adapted to receive an internally screw threaded cap 24. This cap 24 is provided with a tapered bore 25 adapted to coact with tapered portions 22 of the fingers 18.

It will be seen that when the cap 24 is screwed down upon the threads 23 of the shank 10 the tapered surface thereof contacting with tapered surfaces of the fingers will cause these fingers to be forced into engagement with the flutes of the tool. In order to facilitate the turning of the cap 24, it is provided with circumferentially spaced recesses 26 adapted to receive a wrench.

As many changes are possible in the shape, size, and arrangement of the various parts shown and described, I do not limit myself to the specific structure herein set forth, but may make any such changes without departing from the spirit of the invention, or the scope of the subjoined claim.

What I claim is:

In a chuck, a body portion provided with an axial bore having circumferentially spaced slots therein adjacent the outer end of the body portion, the outer end of the body portion being externally threaded, a chucking portion embodying a shank adapted to be received within the bore in said body portion, said shank being provided upon one end with circumferentially spaced fingers, a relatively large shoulder formed on each of said fingers, said shoulders being adapted to be received in the slots in said body portion, the outer ends of said fingers being provided with tapered portions adjacent said shoulders, and an internally threaded cap engaging the external threads of the body portion, the outer end of said cap being tapered internally to engage the tapered portions of said fingers.

In testimony whereof I affix my signature in presence of two witnesses.

JOSEPH JOHN DIEL.

Witnesses:
 A. DICKMAN,
 MARTIE H. REILLY.